United States Patent [19]

Bossard et al.

[11] Patent Number: 4,805,979
[45] Date of Patent: Feb. 21, 1989

[54] FIBER OPTIC CABLE SPLICE CLOSURE

[75] Inventors: Ronald G. Bossard, Austin; Dean C. Krenz, Round Rock; Russell P. Smith, Georgetown, all of Tex.

[73] Assignee: Minnesota Mining and Manufacturing Company, St. Paul, Minn.

[21] Appl. No.: 93,339

[22] Filed: Sep. 4, 1987

[51] Int. Cl.⁴ .......................... G02B 6/36; G02B 6/38
[52] U.S. Cl. ............................. 350/96.20; 350/96.21; 350/96.22
[58] Field of Search ................. 350/96.20, 96.21, 96.22

[56] References Cited

U.S. PATENT DOCUMENTS

| | | | |
|---|---|---|---|
| 4,332,435 | 1/1982 | Post | 350/96.20 |
| 4,428,645 | 1/1984 | Korbelak et al. | 350/96.20 |
| 4,512,628 | 4/1985 | Anderson | 350/96.20 |
| 4,556,281 | 12/1985 | Anderson | 350/96.20 |
| 4,619,499 | 10/1986 | Gerber | 350/96.20 |
| 4,666,240 | 5/1987 | Caron et al. | 350/96.20 |
| 4,679,896 | 7/1987 | Krafcik et al. | 350/96.20 |

FOREIGN PATENT DOCUMENTS

| | | |
|---|---|---|
| 0105597 | 4/1984 | European Pat. Off. . |
| 0159857 | 7/1985 | European Pat. Off. . |
| 2176024 | 6/1986 | United Kingdom . |

Primary Examiner—William L. Sikes
Assistant Examiner—Georgia Y. Epps
Attorney, Agent, or Firm—Donald M. Sell; John C. Barnes

[57] ABSTRACT

A fiber optic splice closure for protecting the splice made into a transmission cable, containing a plurality of fibers which are to remain unsevered, comprises a base to which the cable is anchored and in which slack fibers in the uncut cable are looped and stored free of transverse barriers. The seal is made with the cables and the base by a mating cover provided with a second area to receive splice trays and slack fibers selected from the cable for splicing.

13 Claims, 5 Drawing Sheets

FIBER OPTIC CABLE SPLICE CLOSURE

BACKGROUND OF THE INVENTION

1. Field of the Invention

This invention relates to a splice closure assembly which will provide a sealed closure for splices in a fiber optic cable, and in one aspect to a splice closure which affords significant storage area for slack fiber upon interrupting a cable to make a branch splice in the cable.

2. Description of the Prior Art

Splice closures are commonplace for wire splices in electrically conductive telecommunication cables. Optical fiber cable splice closures differ in that excess fiber lengths should be provided for anticipated future rearrangements and future additions or changes in the splices and those lengths of fibers must be protected against breakage or bending which would affect transmission properties.

Optical fiber cables are supplied in many configurations and may be of composite constructions which also include electrical conductors. Each of these cables, however, is comprised of at least three functional elements, an outer sheath construction surrounding the optical or composite optical and electrical conductors, provision to withstand cable tension during either placement or when permanently installed, and multiple optical fibers or composite optical and electrical conductors. Optionally, a metallic shield, rodent protection, multiple sheath layers, hydroscopic filling compound, multiple dielectric strands, and the like may be provided. At each access location where it is necessary to remove a portion of the cable sheath, it is necessary to protect the optical fibers by a splice closure which restores mechanical and environmental protection for the cable. The splice closure protects the fibers from breakage or bend radii which would induce attenuation loss or signal interruption. A protective buffer tube surrounds each optical fiber or group of optical fibers, and is maintained between the cable sheath opening and a protective splice tray which stores the optical fiber splices and exposed unprotected optical fibers.

Excess optical fiber capacity is required for each spliced fiber and for unspliced fibers where only a percentage of the cabled optical fibers or fibers in a cable are spliced as in a branch splice. Installing uncut cables, i.e. unsevered optical fibers, in a splice closure improves network reliability by minimizing optical fiber discontinuities and avoiding unnecessary splices. In a location where it is necessary to interrupt an optical fiber and obtain access to the cable and the buffer tube with the selected optical fiber(s), it is necessary to sever and remove a portion of the sheath of the cable and gain access to the buffer tubes. A predetermined length of slack for buffer tubes of the main cable are then formed into loops to be placed in the splice closure. The buffer tube to which access is desired is selectively removed and the exposed fibers are drawn from the buffer tube and are formed into a loop or loops for storage in the splice tray with the selected fiber cut and spliced to the end of another fiber extending from the branch cable directed to a remote distributing site or other signal processing equipment. Sufficient slack in the buffer tubes and optical fibers from one buffer tube allows future splicing and the most network flexibility and would not require rebuilding the transmission line to affect additional or subsequent splices in the same area. Adequate storage for unsevered buffer tubes and severed buffer tubes is required.

In those instances where multiple optical fibers are contained within a single unsevered buffer tube, the branch cable splice may require splicing only a percentage of those fibers. This situation is accommodated by selectively removing a mid-slack length of buffer tube, installing both tube ends within a splice tray to house the spliced fibers, severing and splicing the required fibers, and coiling the unsevered, unprotected remaining fibers for storage within the splice tray.

Thus the present invention provides a fiber optic cable splice closure for branch line splices without interrupting the continuity of unspliced optical fibers in the same cable and to which no splice is made. The present invention is directed to a fiber optic cable splice closure for use in making branch splices to a transmission cable. The closure comprises basically a two-piece mechanical closure assembly including a base and cover and integrated cable termination hardware within the base for providing strain relief to the jacket of the cable assembly.

The closure of the present invention provides a strength member anchor for the strength member of the cables installed in the closure.

The present invention provides a splice holder for control and storage of the slack fibers which are spliced and buffer tube retainers to retain and store the uncut slack fibers in the closure in an environment to restrict damage thereto and afford protection therefor. The present invention provides a closure which is readily expanded by the addition of one or more adapter plates expanding the closure assembly capacity to accommodate a greater number of cables.

The features of the closure constructed according to the present invention are not present in the prior art closures. For example, the closure of U.S. Pat. No. 4,428,645 is not designed to accommodate a branch splice in a transmission cable. It is designed to enclose only butt splices between optical fibers in two cables, first cable 20 and second cable 21. Thus, the closure has limited utility. There is provision for slack cable storage but the cable sheath and shield are not removed for access to cable strain members and slack buffer tubes in a multi-fiber cable. There was no dedicated area to store slack unsevered protected optical fibers or a second storage area providing space for an installed splice tray to store slack severed optical fibers and splices therebetween. Each cable is required to pass through an orifice into the closure, and then to pass through openings 43 and 46 into separate storage areas and then through additional separate openings 25 and 26 into an organizer B. Such structure thereby preventing storage of unsevered fibers. The dedicated areas of the present invention are open, without transverse barriers for initially laying in loops of unsevered optical fibers of a transmission cable and loops of the selected fibers. Additional cables from or forming branch lines may terminate at the closure or run through the closure.

A prior closure of AT&T comprises a base and a closure cover. Two additional separate closure covers are used to seal and terminate the cables to the base. Hinged storage leafs are used to store the spliced fibers and the closure cover fits on the upper storage leaf. The base is not provided with a dedicated area free of transverse barriers for unsevered fiber storage or adequate space or retaining means to store excess buffered fiber. In this closure the severed cable may comprise ribbons with splice connectors on the ends of the fibers which must be routed through retaining rings positioned in the base before being directed to the splice platform.

PSI Telecommunications Inc. also markets a Z fiber optics splice closure system for splicing optical fibers which comprises a base and a closure cover with two functional cable ports. Splice storage trays are mounted between side brackets of a footed axial beam with a cross beam to provide cable strain relief. Excess buffered fiber length is coiled about splicing tray edges for storage. Storage of unsevered optical fibers beneath the splice tray is prevented by the axial beam and the interior volume it occupies. No side retaining means for looped unsevered fiber is provided. No means for restricting cable sheath movement is provided. Branch line cables must also enter through the two ports, greatly restricting utility and use for future cable additions.

The closure of the present invention has many advantages over the prior art. It accommodates branch splices readily as it provides storage for unsevered cable.

The closure of the present invention provides an anchor for the strength member and strain relief for the cable adjacent the severed sheath and shield of multiple cables.

The present invention affords expansion to accommodate additional cables for connection to the transmission cable or another cable.

SUMMARY OF THE INVENTION

The fiber optic cable splice closure assembly of the present invention comprises a base and a cover which mate and form therebetween entry or exit ports for the fiber optic cables. A mastic sealant is used at the mating surfaces to seal the same hermetically. The cover and base ar secured together by suitable fastening means. The base is generally rectangular and is formed with dedicated space to receive loops of protected optical fibers without encountering barriers. The base has strain relief members adapted for connection to the cable sheath and means for anchor connection to the strength member. The chamber formed in the rectangular base member is adapted to receive looped buffer tubes providing for slack fiber. Means are provided for receiving one or more splice organizing trays in a separate dedicated area of the chamber. Means are provided for retaining the looped buffer tubes releasably within the base and an adapter plate cooperating with the base and cover may be utilized for increasing the capacity of the closure to receive additional cables.

The splice closure of the present invention is provided with mounting means affording the mounting o the closure member as is most convenient to the service technicians.

The closure of the present invention is specifically designed to afford re-entry and protects the cable and slack fibers.

The base has adequate buffer tube storage and has an interior width and length to accommodate the fibers and thus is provided with a width at least twice the minimum bending radius of the fibers affording the coiling or looping of the slack fiber within the chamber defined by the base and cover.

The fibers are looped and placed within the chamber about the location of the anchor means for the strength member of the cable. This places the slack fiber out of the way of the splicing operations to the cut fiber.

BRIEF DESCRIPTION OF THE DRAWING

The present invention will be further described with reference to the accompanying drawing wherein.

DETAILED DESCRIPTION

Figure 1:
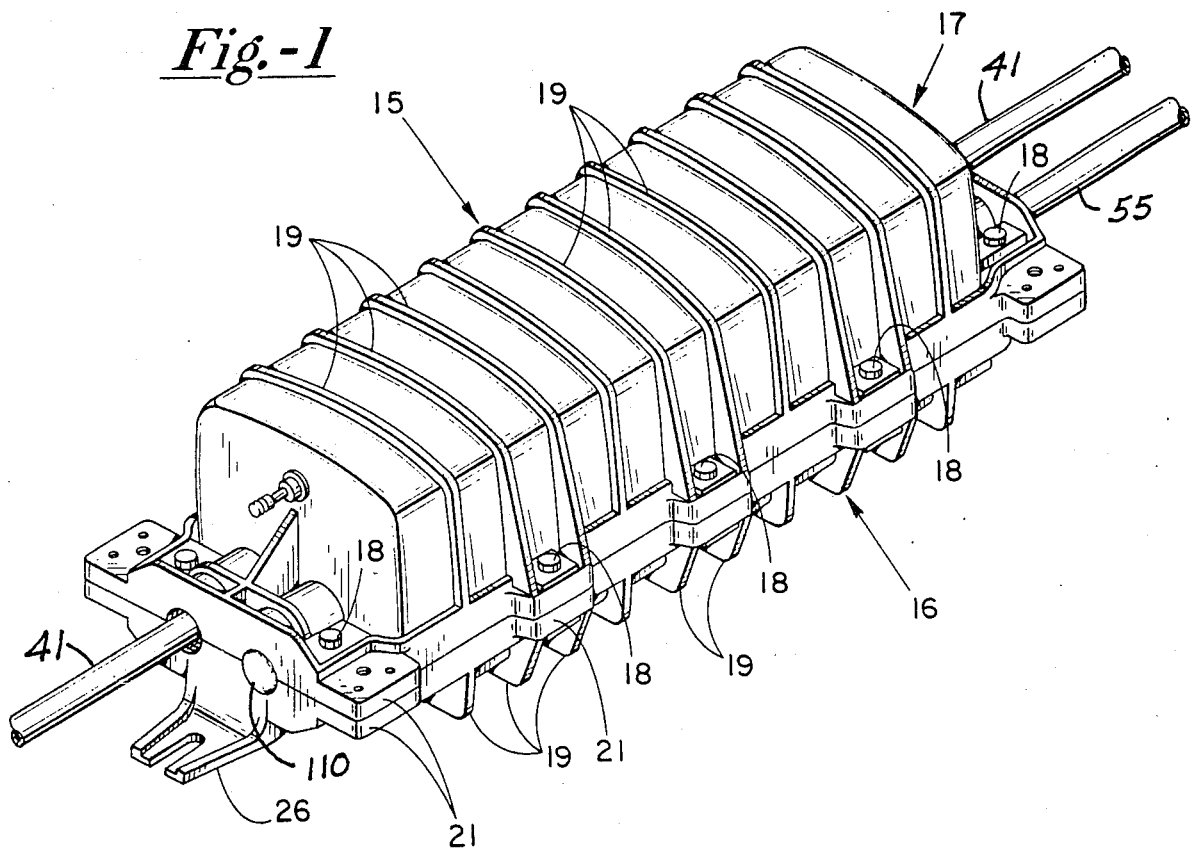
FIG. 1 is a perspective view of a fiber optic cable splice closure assembly illustrating three cables associated therewith.

Referring now, to the drawing, wherein like numerals refer to like parts throughout the description, the closure assembly is generally designated by the reference numeral 15 and comprises a base member 16 and a cover 17. The base member and cover are shell-like and have mating surfaces which are secured together by means of fastening members in the form of bolts 18 positioned in peripherally spaced relation about the cover and base. Preferably the cover and base are formed with rib members 19 which extend over the surface thereof to strengthen the molded parts.

Figure 2:
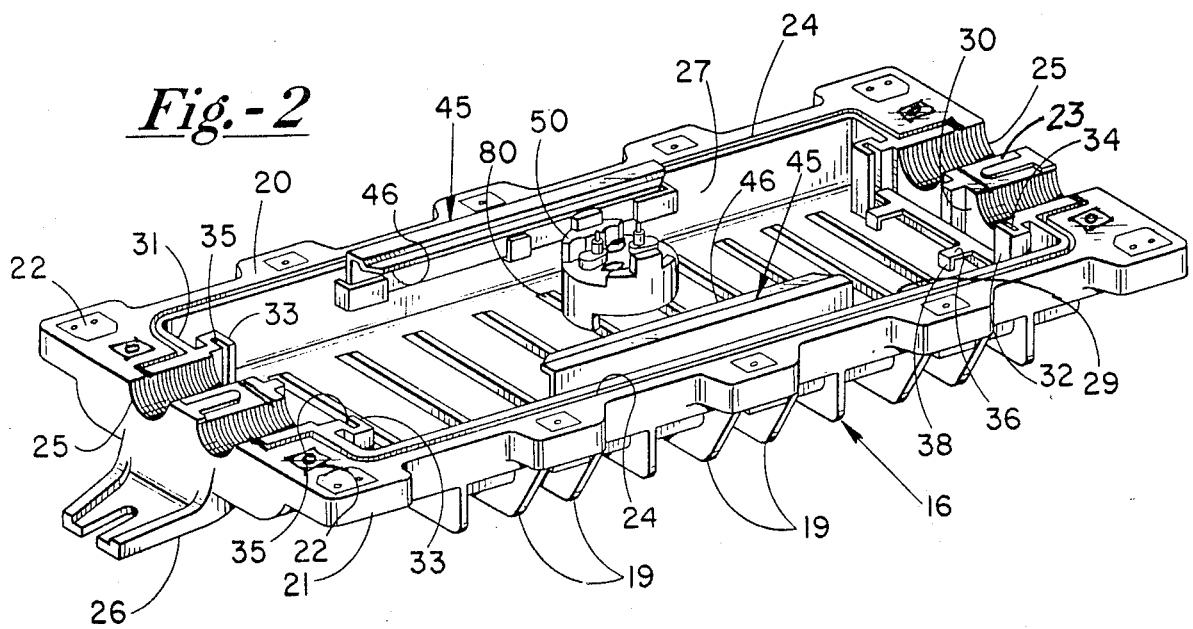
FIG. 2 is a perspective view of the base of the splice closure.

Referring now to FIG. 2 there is illustrated a perspective view of the base 16 which is generally rectangular in shape and molded from a rigid thermoplastic material which is resistant to heat, pressure, weathering and environmental hazards. An example of such a material is polyester or blended polyester. Formed around the surface 20 of the base and mating surface of the cover is a plurality of peripherally extending projections 21 in each of which is placed an insert 22 which receives a bolt 18 to hold the mating surface of the cover against the surface 20 of the base.

In the surface 20 of the base 16 is formed a plurality of channels defining a sealing channel 24 which will receive a sealing strip or cord formed of mastic sealant material to provide a seal between the surfaces. Also formed in the surface 20 are a plurality of arcuate walls 25 having corrugations and which are formed to receive a cable and define an inlet or outlet port for the cables into the chamber formed within the base and cover. The cable extending through a port formed by the arcuate walls 25 are wrapped with a sealing tape formed of a mastic material to assure a hermetic seal about the cable within the port. A split washer 121 having an inside diameter to receive the cable and an outside diameter to fit within a corrugation in the opposed walls 25 is placed at each end of the sealing tape convolutely wrapped on the cable. Small channels 23 are formed in the portion of the wall 20 between the arcuate walls 25 to complete the channel 24 to seal the chamber. At each end of the base 16 is formed a mounting bracket 26 for mounting the closure member to another structure, if desired, as will be described hereinafter. Holes are provided through the corners for aerial strand mountings.

The base 16 is formed with a recessed interior defined by vertical side walls 27 and 29 and end walls 30 and 31. Integral with the end walls 30 and 31 are a pair of brackets 32 and 33 respectively, which are formed with vertically disposed slots 34 and 35 respectively, to receive the opposite ends of strain relief brackets 36. The strain relief brackets 36 are stamped from metal sheets and comprise plate-like end members 37, which fit in the slots 34 and 35 to position the brackets 36. A right angle shelf and arms 38 (see FIG. 2) which project perpendicular to the bracket shelf and are generally aligned with the axis of arcuate walls 25, defining the cable ports, afford receipt of cable clamps 40 (see FIGS. 3, 4, and 7) which are positioned about each cable 41 and 55, forming strain relief means for restricting the movement of the cables axially into or out of the base 16.

Positioned on opposite sides of the recess formed in the base by the side walls 27 and 29 are a pair of fiber optic cable restraining members 45 which are formed with inwardly projecting overhanging lips 46 to maintain the loops of fiber optic buffer tubes 44 in the base after the same have been generally formed in successive loops and placed within the base beneath the lips 46 of the retaining members 45. The fiber optic tubes have a tendency to return to a straight line position and thus these retaining members 45 maintain the coils or loops of slack tubes within the base out of the way of manipulations on individual discrete fibers 42 within any buffer tube 44 disposed within the cable 41. The base 16 is also provided with an anchor member 50 to which the cable is secured. The cable 41 has a strength member 48 and a protective sheath 53, and may have a shield 52 which is generally metallic to serve not only as an electrical shield and ground but also as an armor covering for protecting the cable and to protect the optical fibers 42, normally protected by buffer tubes. Covering the shield 52 is an outer layer of insulating material forming the sheath 53 for the cable. The strength member 48 is affixed securely to the anchor member 50.

Figure 3:
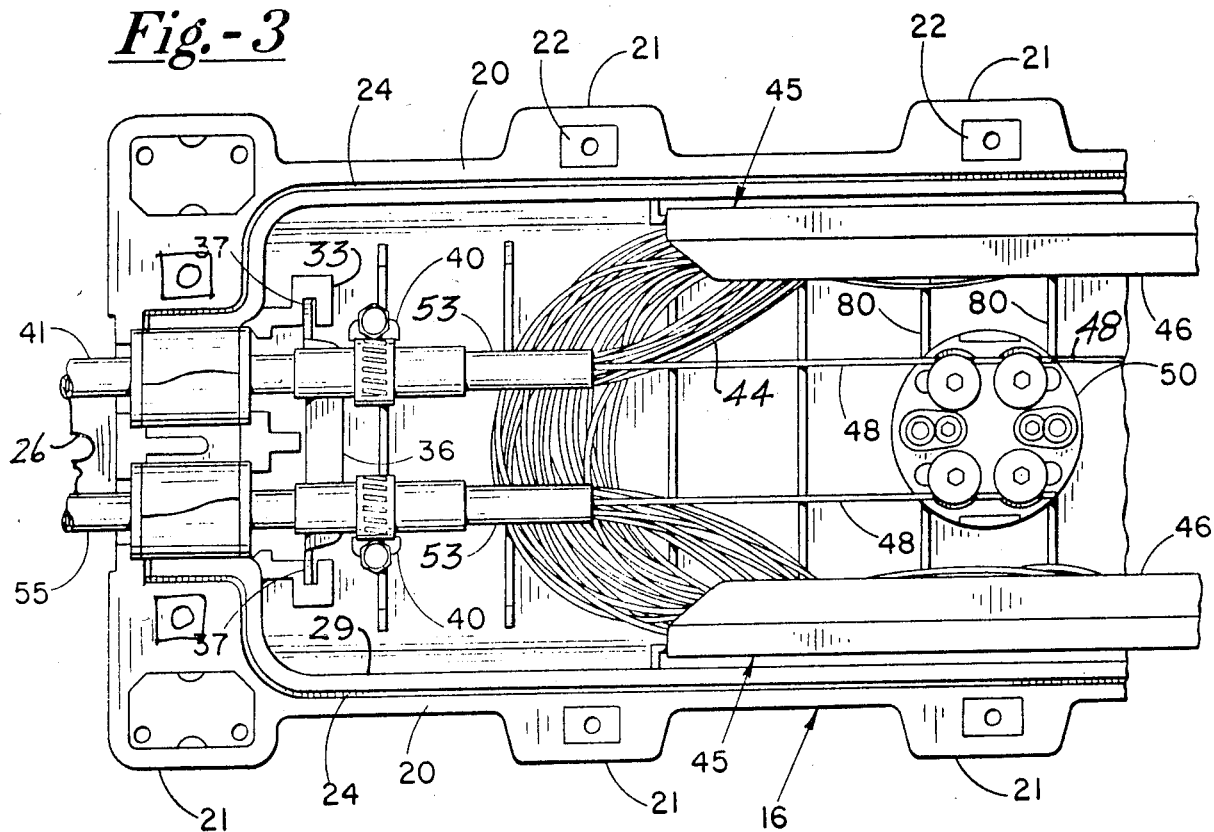
FIG. 3 is a fragmentary plan view of the base illustrating two cables installed at one end thereof.

In making a branch splice into a transmission cable the transmission cable 41 is directed to the closure assembly 15. Suitable additional slack cable is provided and the sheath 53 and shield 52 are cut and separated from the buffer tubes 44 contained within the cable. The exposed buffer tubes 44, which contain a single or a plurality of discrete optical fibers 42, are looped and laid within the chamber of the base without severing the buffer tubes. The strength member 48 is then severed to provide lengths thereof which are sufficient to extend from the end of the sheath 53 to the anchor member 50 formed to receive the strength members 48 and hold the same in fixed position against axial displacement. The anchor members 50 will be described in greater detail hereafter. The coiled buffer tubes are disposed about the anchor member 50 and placed into the recess of the base 16, and the ends of the strength members 48 are then secured to the anchor member 50 and serve also to retain the coils of buffer tubes 44 in the base as illustrated in FIG. 3.

A pressure sensitive adhesive coated rubber tape 49 is wrapped about the cable sheath 53 and the hose clamps 40 are installed about the tape 49 and cable to anchor it to the arm 38 of the strain relief bracket 36. The branch cable is then similarly installed.

Each of the buffer tubes 44 may contain 1 to 12, or more, individual optical fibers 42. In a branch splice it is possible that only one of the transmission fibers is spliced to a fiber in a branch cable generally indicated as 55. Thus the protective flexible cover of the selected buffer tube 44 is removed, exposing the optical fiber 42. Each fiber in a tube 44 is provided with an adherent coating to protect the optical fiber. Perhaps only one of the fibers of the buffer tube, of which there may be 12, are separated, and the fiber into which the splice is to be made, is directed into a splice receiving tray 60. Thus, in making a branch splice approximately 5 meters of the transmission line have the sheath 53 removed therefrom and the ends of the sheath which remain are wrapped with sealing tape and placed in the ports for the closure. In making a splice of cut transmission cables approximately 2.5 meters of buffer tubes from each of the cables to be spliced are wrapped within the splice closure. About 2.5 meters of the branch cable would also be placed in the closure with its strength member anchored to the base similar to strength member 48.

Figure 4:
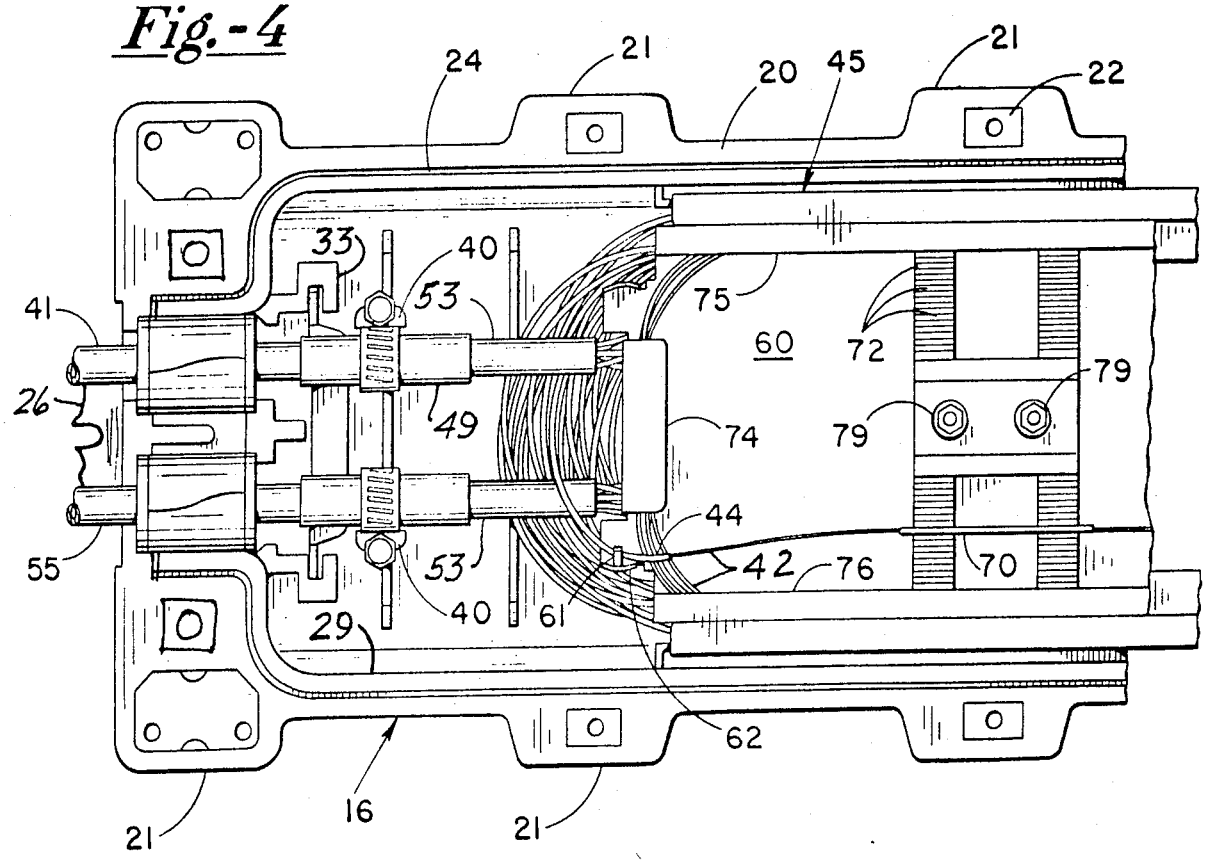
FIG. 4 is a further fragmentary plan view of the base with a pair of cables installed with a splice organizing tray mounted on the central anchor members.

Referring now to FIG. 4 there is a fragmentary disclosure of the splice organizing tray 60 wherein one buffer tube is selectively removed exposing the optic fibers and is brought to the tray and the buffer tube ends are secured by separate wire ties 61 to strain relief brackets 62 located at each end of the splice tray 60. A similar buffer tube is brought from the branch cable 55 and is secured by a wire tie to a bracket at the opposite end of the tray 60 and the discrete fiber or fibers to be joined by a splice are spliced, as illustrated at 70, and placed in the splice receiving channels 72 centrally of the tray 60. The fibers 42 which are not cut to be spliced to fibers in the branch cable 55 are coiled and placed beneath the fiber retaining lips 74, 75, and 76, around the periphery of the tray 60. Any severed fibers contained within the buffer tubes and which are not spliced are likewise coiled and placed beneath the splice tray retaining lips.

The tray 60 is mounted by fastening means 79 such as nuts onto threaded members extending from the tops of the anchor members 50.

Figure 5:
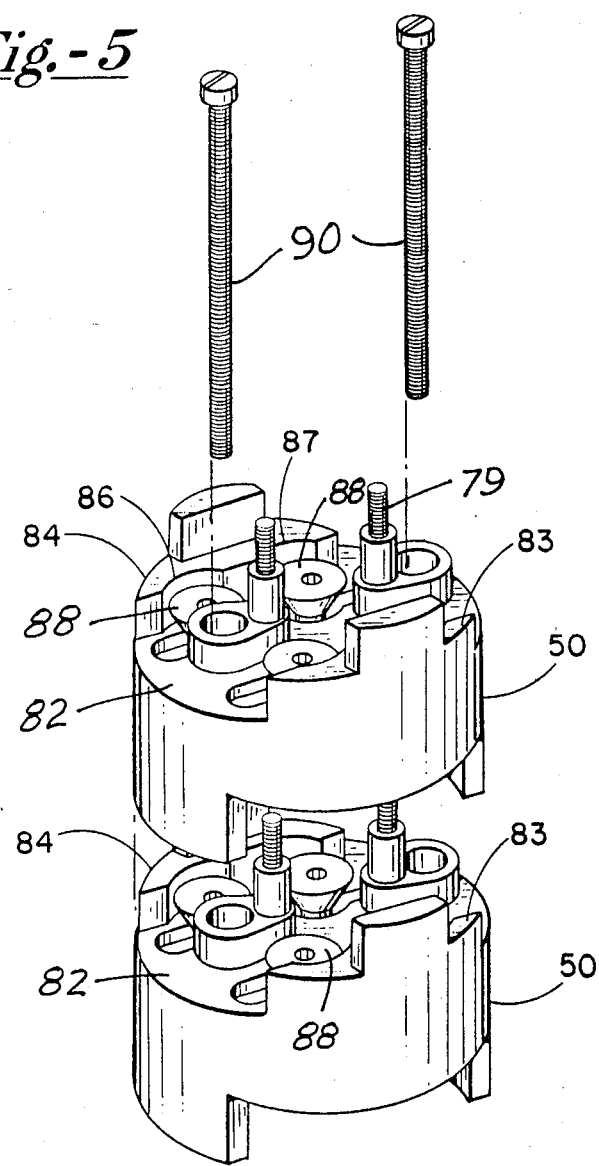
FIG. 5 is an exploded perspective view of two anchor members adapted to fit into the base.
Figure 6:
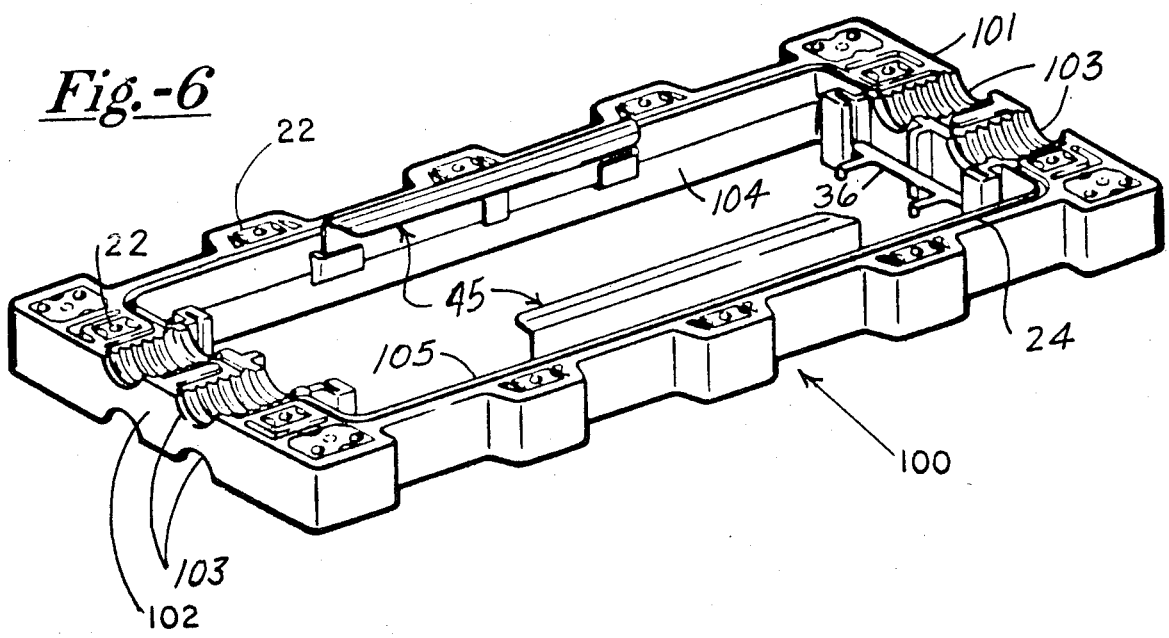
FIG. 6 is a perspective view of an adapter or spacer plate.

Referring now to FIG. 5 it will be shown that the strength member anchor 50 comprises a generally cylindrical member formed at its base with a generally diametric channel to receive the ribs 80 mounted transversely of the base 16. The ribs are projecting about 15 mm in height extending across the base. On the upper surface 82 of the anchor member 50 is a pair of diametrically opposed projections 83 and 84. Each of these projections have a semicylindrical outer wall which is coincedent with the cylindrical wall of the anchor member 50, and the inner surface of the axially extending projections 83 and 84 is formed with arcuate wall portions 86 and 87 separated by a wall which wall portions form a serpentine path along the inner surface of the projections. Anchor bolts 88, formed with generally flat topped inverted cone-shaped heads, are positioned to engage the strength members 48 along their length and drive the same or wedge the same into contact with the arcuate surfaces 86 and 87 to bind the strength members tightly against the surfaces 86 and 87 and the upper surface 82 to restrict axial movement thereof with respect to the projections 83 and 84. Mounting bolts 90 are provided to mount the anchor member to the base.

If two anchor members 50 are needed to anchor the strength members in the closure assembly they are adapted to be stacked with respect to each other as illustrated in FIG. 5 such that the channel formed in one anchor straddles the projection of the lower anchor member. Thus four strength members may be anchored in overlapped position by the lower anchor member and any additional strength members from additional cables installed in the closure when an adapter plate is used are anchored on the upper anchor member in generally aligned position with respect to the entrance or exit ports defined by arcuate walls 25 in the base or cover.

When additional cables are to be spliced in a single closure, it may be necessary to utilize an adapter or spacer plate 100 which has an outline generally corresponding to the surface 20 of the base 16. This adapter plate 100 is formed with end walls 101 and 102 in which are formed arcuate wall portions 103 on opposite sides of the walls 101 and 102 to cooperate with the arcuate wall portions 25 in the base and corresponding arcuate walls in the cover to multiply the number of cable receiving ports available. The adapter plate 100 is also formed with channels corresponding to channels 23 and 24 to receive the cord of mastic sealant material such that the proper seal is formed about the closure member. The inner edge of the walls 104 and 105 on the adapter plate extend below the outer edge to form an aligning rib with the base or another adapter plate. The inserts in the corresponding projections are formed with holes for the fastening bolts to pass through.

If the base, adapter plate, and cover form to many entrance ports for the number of cables spliced together, the additional ports are blocked by use of plugs 110 which are shaped like a spool and wrapped with the sealing tape such that they will fit in the arcuate walls and suitably seal the unused ports.

Figure 7:
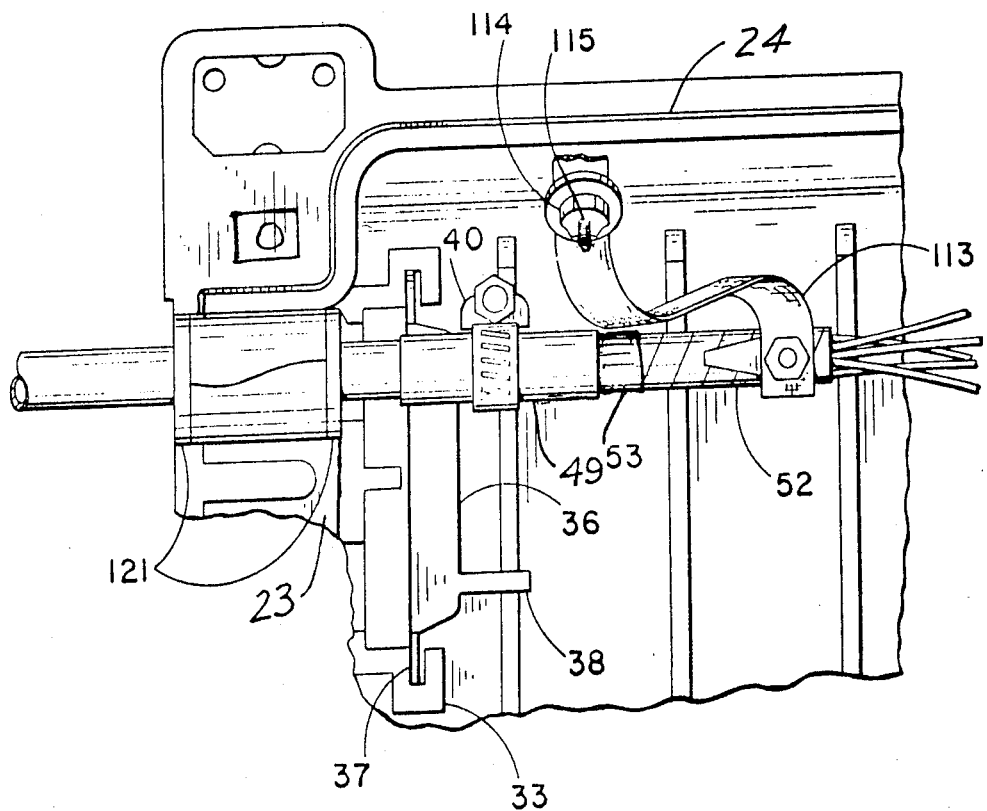
FIG. 7 is a detail view of the base showing a cable anchored thereto and a ground cable secured to the cable shield.

As shown in FIG. 7, it is also important that the ground shield 52 of the cables 41 and 55 is properly ground in the splice closure such that there is electrical continuity of the ground between all cable portions. As noted in FIG. 7, a ground strap 113 may be adhered to the cable shield 52 and joined by a fastening element 114 to a connector 115 on the side wall of the base to suitably couple the ground shields 52 and provide connection to earth ground.

Figure 8:
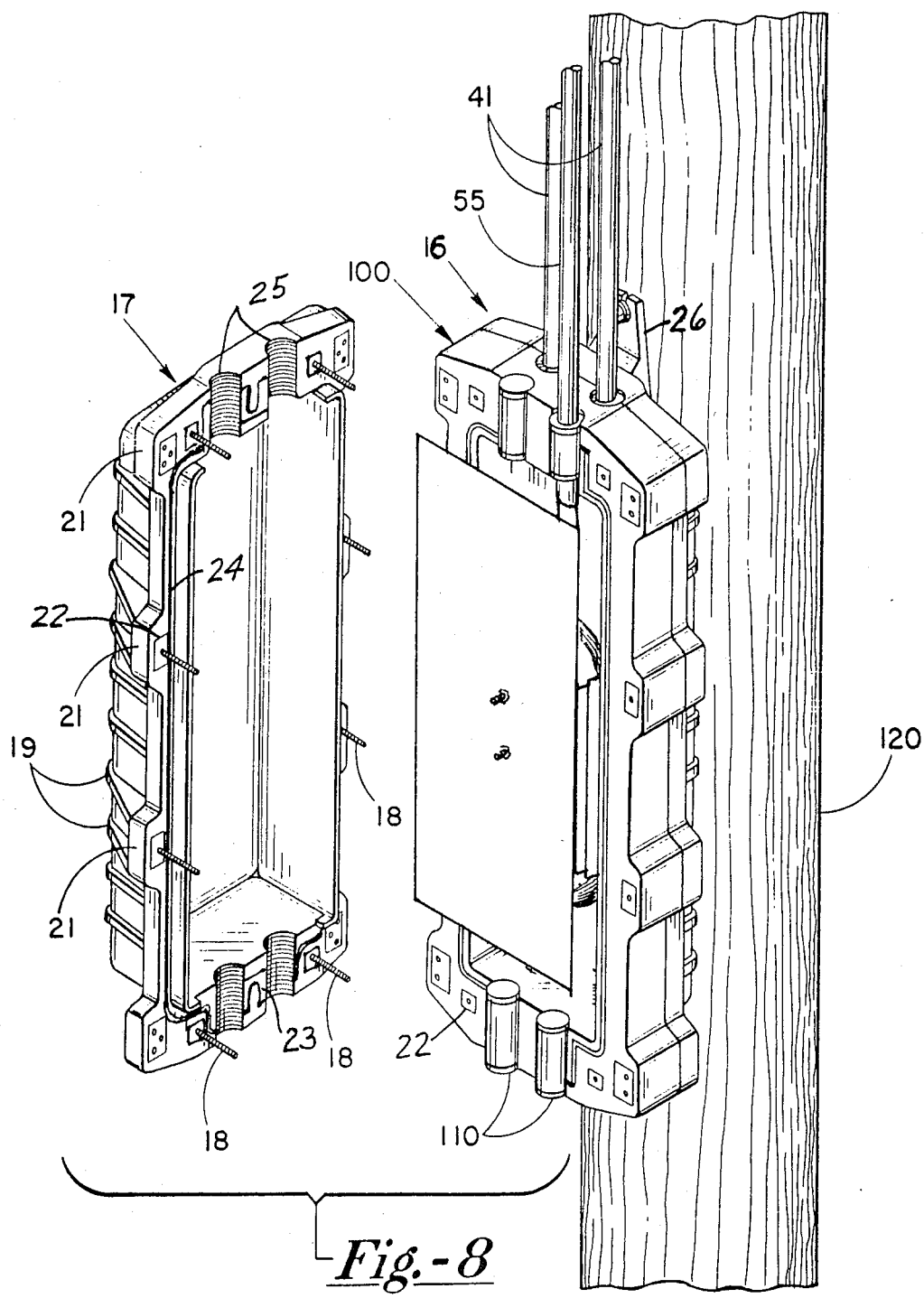
FIG. 8 is a view of a closure of the present invention mounted on a pole with the cover lifted to show the adapter plate assembled onto the base between the base and the cover.

Referring now to FIG. 8 there is shown a pole 120 upon which is mounted the closure assembly 15. Suitable transmission cable portions 41 have been sealed to the base 16 and to an adapter plate 100. The splice trays 60 are stacked and bolted to the stacked anchor members 50. The cover 17 is ready to be positioned over the exposed surface of the adapter plate 100 and sealed with the sealing cord in the channels, the sealing tape about the cables and spools for sealing the surfaces together when the fastening members 18 are secured. Suitable plugs 110 wrapped with sealing tape are placed in the unused ports of the splice closure. Mounting brackets 26 are used to mount the closure 15 to the pole 120 or other surface.

The splice closure kit thus comprises the base 16 and the cover 17 with a plurality of fastening bolts 18. Sealing washers 121 are provided which are slit rings adapting the same to be placed over the cable and formed to abut each end of a sealing tape of mastic sealant material which is wrapped about the cables. The washers 121 engage the corrugations formed in the arcuate walls 25 to maintain the mastic sealant in place so the same will not be squeezed from the ends of the ports. A plurality of plugs 110 are used to plug the unused ports. One or more anchor members 50 are provided to anchor the strength members. A plurality of cable ties permit the buffer tubes to be anchored to the splice trays 60. Sealing cord which is a strip of mastic material is afforded to be laid in the channels surrounding the surface of the base. A ground strap 113, together with splice trays 60 and a plurality of cable clamps 40 are also provided.

Having thus described the present invention with respect to a preferred embodiment, it will be appreciated that changes may be made without departing from the scope or spirit of the present invention as defined in the appended claims.

We claim:

1. A splice closure assembly for a branch-line fiber optic cable splice which fiber cable comprises an outer sheath, a plurality of optical fibers and a strength member, said assembly comprising a pair of mating shell-like closure members including base means and cover means for defining a three dimensional chamber, said base means and cover means each having a mating surface having opposed arcuate wall portions defining at least a pair of cable entry ports when assembled, anchor means within said base means and disposed in generally aligned relationship with said entry ports for securing a strength member of a said fiber optic cable to said base means, said chamber having length, width and depth dimensions to afford a first open storage area for at least one loop of optical fiber therein without deleterious effect on said optical fiber, retaining means supported by said base means for positioning said at least one loop of optical fiber in said base means, and said cover means affording means for receiving and storing at least one splice tray supported from said base means and spaced from said first storage area.

2. A splice closure assembly according to claim 1 wherein the width and length of said chamber are at least twice the minimum bending radius of the fibers affording a looping of slack fiber within said chamber.

3. A splice closure assembly according to claim 1 wherein said mating surfaces of said base means and cover means have means for retaining a sealing strip therebetween to form an hermetic seal for said chamber.

4. A splice closure assembly according to claim 3 wherein:

a mastic sealant material is wrapped on a said fiber cable and cooperates with said arcuate wall portions for forming a seal for a said cable in said entry ports.

5. A splice closure assembly according to claim 4 wherein means are provided for strain relief on a said fiber cable adjacent said entry ports.

6. A splice closure assembly according to claim 1 wherein said anchor means comprises a member secured in said base means and comprising means defining a surpentine path in which a said strength member is forced to anchor the same.

7. A splice closure assembly according to claim 1 wherein said base means is generally rectangular and said anchor means is positioned generally centrally of said base means affording said first storage area about said anchor means, and comprising support means for supporting a splice tray to said base means.

8. A splice closure assembly according to claim 7 wherein said support means are incorporated with said anchor means.

9. A splice closure assembly according to claim 1 comprising adapter plate means adapted to fit between said base means and cover means to increase the size of said first storage means and multiply the number of said entry ports.

10. A splice closure assembly according to claim 6 wherein said anchor means comprises a pair of similar members adapted to be stacked in said base means to accommodate multiple strength members.

11. A splice closure assembly according to claim 6 wherein said anchor means comprises support means for supporting a splice tray in spaced relationship to said base means.

12. A splice closure assembly according to claim 9 wherein said adapter plate means comprises means for retaining a sealing strip for making sealing engagement with said mating surface of said base means and said cover means.

13. A splice closure kit for fiber optic cable splices comprising a generally rectangular base with a mating surface surrounding a central cavity defining a first storage area, a mating cover for attachment to said base, said cover having a mating surface surrounding a cavity defining a second storage area, said cover and base having cooperating arcuate wall means in said mating surfaces defining cylindrical cable entry ports into said first storage area, a strength member anchor adapted to be attached to said base in said first storage area and disposed in generally aligned relationship with said entry ports, a splice tray adapted to be secured to said base and be received in said second storage area, sealing cord of a mastic sealant for fitting between said mating surfaces of said base and cover to seal the same, and sealing tape for wrapping a said cable to seal the entry ports when said base and cover are in mating engagement.

* * * * *

UNITED STATES PATENT AND TRADEMARK OFFICE
CERTIFICATE OF CORRECTION

PATENT NO. : 4,805,979
DATED : February 21, 1989
INVENTOR(S) : Ronald G. Bossard, Dean C. Krenz, and Russell P. Smith It is certified that error appears in the above-identified patent and that said Letters Patent is hereby corrected as shown below:

Column 3, line 37, correct "ar" to —are—.

Column 3, line 53, correct "o" to —of—.

Column 4, line 28, delete "," after "now".

Column 7, line 47, after "bolted" add —via bolts 79—.

Signed and Sealed this

Twentieth Day of November, 1990

Attest:

HARRY F. MANBECK, JR.

*Attesting Officer*

*Commissioner of Patents and Trademarks*